United States Patent [19]
Minot et al.

[11] Patent Number: 5,397,889
[45] Date of Patent: Mar. 14, 1995

[54] GUIDED-WAVE PHOTORECEPTOR BASED ON QUANTUM WELLS MADE OF SEMICONDUCTOR MATERIALS, PARTICULARLY FOR COHERENT COMMUNICATIONS SYSTEM WITH POLARIZATION DIVERSITY

[75] Inventors: Christophe Minot, Paris; Marcel Bensoussan, Boulogne, both of France

[73] Assignee: France Telecom Etablissement Autonome de Droit Public, France

[21] Appl. No.: 34,263

[22] Filed: Mar. 22, 1993

[30] Foreign Application Priority Data

Mar. 23, 1992 [FR] France .................. 92 03453

[51] Int. Cl.⁶ ............................... H01J 40/14
[52] U.S. Cl. ................... 250/214.1; 385/9
[58] Field of Search .......... 250/214.1, 214 R, 214 LS; 257/436, 437, 440, 466, 656, 425; 385/2, 9, 10, 28, 37, 40

[56] References Cited

U.S. PATENT DOCUMENTS

| | | | |
|---|---|---|---|
| 4,966,431 | 10/1990 | Heismann | 385/11 |
| 5,117,469 | 5/1992 | Cheung et al. | 385/11 |
| 5,125,050 | 6/1992 | Deri | 385/28 |

OTHER PUBLICATIONS

Article by Zah et al., Electronic Letters, vol. 27, No. 10, May 9, 1991 pp. 838–839.
Article by Choa et al., IEEE Photonics Technology Letters, vol. 1, No. 11, Nov. 1989, pp 376–378.
Article by Wehmann et al., and Optoelektronik, vol. 21, No. 5, Oct. 1989, pp. 42–51.
French Search Report–FR 9203453–FA 472233.

*Primary Examiner*—David C. Nelms
*Assistant Examiner*—Que T. Le
*Attorney, Agent, or Firm*—Pearne, Gordon, McCoy & Granger

[57] ABSTRACT

Guided-wave photoreceptor based on quantum wells made of semiconductor materials, particularly for coherent communications system with polarization diversity.

This photoreceptor has at least one pair composed of a first photodetector (76) and a second photodetector (78). At least the first photodetector is formed on a semiconductor substrate (94) and has a multilayer ribbon with multiple quantum wells made of semiconductor material (100); this multilayer ribbon is provided to guide an incident light; the first photodetector is capable of absorbing the transverse magnetic component of that light, whose electrical field has a component perpendicular to the plane of the multilayer; the transverse electrical component of that light is virtually not absorbed in the first photodetector; the second photodetector is provided to absorb this transverse electrical component.

13 Claims, 7 Drawing Sheets

FIG. 9B ns system.
GUIDED-WAVE PHOTORECEPTOR BASED ON QUANTUM WELLS MADE OF SEMICONDUCTOR MATERIALS, PARTICULARLY FOR COHERENT COMMUNICATIONS SYSTEM WITH POLARIZATION DIVERSITY

BACKGROUND OF THE INVENTION

This invention concerns a guided-wave photoreceptor.

It particularly applies to the field of fiber-optic telecommunications, especially to coherent communications systems with polarization diversity.

Coherent transmission systems on single-mode optical fiber are currently undergoing extensive development both for very long-distance communications and for distribution.

In a coherent connection, the receptor (homodyne or heterodyne) makes it possible to detect an incident optical signal by mixing it with an optical wave from a local oscillator which is a perfectly monochromatic laser.

Figure 1:
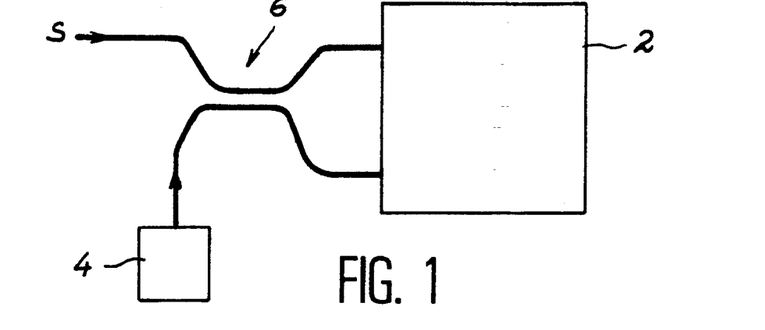
FIG. 1 is a schematic view of a known coherent-connection receiving system and has already been described.

FIG. 1 shows the receptor 2, as well as an optical coupler 6 with two inputs and two outputs.

One input receives the signal S, and the other input receives the optical wave that comes from the local oscillator 4.

The wave that comes from the oscillator is mixed with the signal S using the coupler 6 whose two outputs are connected to the receptor 2 to supply it with two optical signals resulting from the mixture.

One of the delicate points of a coherent connection is that it is impossible to control the optical polarization of the signal S during transmission.

Due to the variable environmental conditions (temperature, torsion, ... ) in which the single-mode optical transmission fibers must operate, which are difficult to control, the state of polarization of the signal S which arrives at the input of the coupler 6 fluctuates randomly.

This causes fluctuations in amplitude in the coherent detection.

Then it is necessary to incorporate into the receiving system (which includes the receptor 2, the local oscillator 4 and the optical coupler 6) a polarization control system (not shown in FIG. 1) which is placed before or after the optical coupler 6.

The photoreceptor includes photodiodes (not shown) which are respectively supplied with preamplifiers (not shown) that are hybrid-mounted or integrated.

But the tendency is to use hybrid mountings of pairs of standard equilibrated photodiodes.

For obvious questions of cost and overall performance of the connection, an attempt is made to put all the functions of the receiving system (coupler, polarization control system, photodiodes, preamplifiers and even the local oscillator) on the same substrate.

But such integration poses problems, particularly because a material suitable for making photodiodes for the optical wavelength considered is not necessarily a material suitable for microelectronic components, such as preamplifiers.

It would therefore be of interest to find some solutions that would make it possible to simplify the receptor system while offering advanced possibilities for micro-optical electronic integration with acceptable performance.

SUMMARY OF THE INVENTION

This invention proposes a photoreceptor structure which makes it possible to simplify the polarization control system used in a coherent communications system.

The photoreceptor which is the object of the invention includes at least one pair composed of a first photodetector and a second photodetector and is characterized by the fact that the first photodetector is formed on a semiconductor substrate and has multilayer ribbon having multiple quantum wells made of semiconductor materials; this multilayer ribbon is provided to guide an incident light both in the plane of the multilayer, by the play of the refraction indices, and laterally because of the ribbon structure; the first photodetector can absorb the transverse magnetic component of that light, whose electrical field has a perpendicular component in the plane of the multilayer; the transverse electrical component of that light is virtually not absorbed in the first photodetector; the second photodetector is provided to absorb this transverse electrical component.

The second photodetector can be any type, but, preferably, in order to obtain a photoreceptor structure suited for optical integration, the second photodetector is also a photodetector formed on a semiconductor substrate and has a multilayer ribbon having multiple quantum wells made of semiconductor materials; this multilayer ribbon is provided to guide an incident light both in the plane of the multilayer, by the play of the refraction indices, and laterally because of the ribbon structure.

In this case, the second photodetector can be placed directly after the first photodetector and oriented so that its multilayer ribbon is in the extension of that of the first photodetector and the respective planes of the constituent multilayers are perpendicular.

It is then a hybrid mounting.

Preferably, in order to obtain a photoreceptor structure that is even better suited for optical integration, the first and the second photodetectors are integrated onto the same semiconductor substrate so that there is continuity in the optical guidance between the multilayer ribbon of the first photodetector and that of the second photodetector, and the respective planes of these multilayers are parallel; and the photoreceptor also includes a polarization converter which is formed on that same substrate, also in a ribbon structure ensuring continuity in the optical guidance, and is between the first and the second photodetector; the converter is there to convert the transverse electrical polarization of the light coming from the first photodetector into a magnetic transverse polarization with a component of the perpendicular electrical field in the plane of the multilayer of the second photodetector; the light whose polarization is thus transformed is injected into the second photodetector where it is absorbed.

In this case, when the photoreceptor is used in a coherent communications system with polarization diversity, this photoreceptor can be mounted in a way that is not equilibrated (with two identical photodetectors for such mounting).

Then, a dual-input, dual-output optical coupler is optically coupled with one of these outputs to the first photodetector; this coupler makes it possible to mix the incident optical signal that you want to detect with an optical wave that comes from a local oscillator, and the signal that results from the mix is sent to the photodetector, with the other output of the coupler remaining free.

In another special embodiment, the mounting is equilibrated: in this case, the unit consisting of the converter and the pair of photodetectors (which are still identical in the case of this form of mounting) is used, as well as another unit identical to the preceding one formed on the same substrate; the other output of the coupler is then optically coupled to the first photodetector of this other unit.

Preferably, each photodetector is formed on a substrate made of GaAs, which makes it possible to take advantage of the micro-electronics developed on GaAs.

This makes it less expensive to integrate this photodetector and the microelectronic components on the substrate; this is described further below in an example.

Thus, in the non-equilibrated mounting mentioned earlier, a GaAs substrate is preferably used on which the two photodetectors are placed, and the same is true for the equilibrated mounting: the four identical photodetectors in this equilibrated mounting are preferably formed on the same GaAs substrate.

According to one special mode of embodiment of the photoreceptor that is the object of the invention, using an electrically controlled polarization converter, the first photodetector, the converter and the second photodetector are made on the same semiconductor substrate, respectively in three distinct zones, from epitaxied layers which, for the photodetector zones, are different from those of the converter zone.

As a variation, the epitaxied layers are identical for the three zones; the photodetector zones are suitably doped after epitaxy, while the converter zone is not doped.

According to another special mode of embodiment of the photoreceptor in the invention, which uses a passive polarization converter, the first photodetector, the converter and the second photodetector are formed on the same semiconductor substrate, respectively in three distinct zones, from identical epitaxied layers for the two zones of the photodetectors, and from dielectric layers deposited for the zone of the converter between the two photodetectors; these layers ensure continuity in the optical guidance.

The photoreceptor in the invention can include two pairs, each having said first photodetector and said second photodetector, which operate in a two-way equilibrated mounting.

Lastly, a preamplifier, which has one input in the non-equilibrated case or a differential input in the equilibrated case, can be integrated on the same substrate as the photodetector whose signal it processes.

BRIEF DESCRIPTION OF THE DRAWINGS

This invention will be better understood by reading the description of examples of embodiment given below, with reference to the appended drawings, where.

DETAILED DESCRIPTION OF THE PREFERRED EMBODIMENTS

Figure 2:
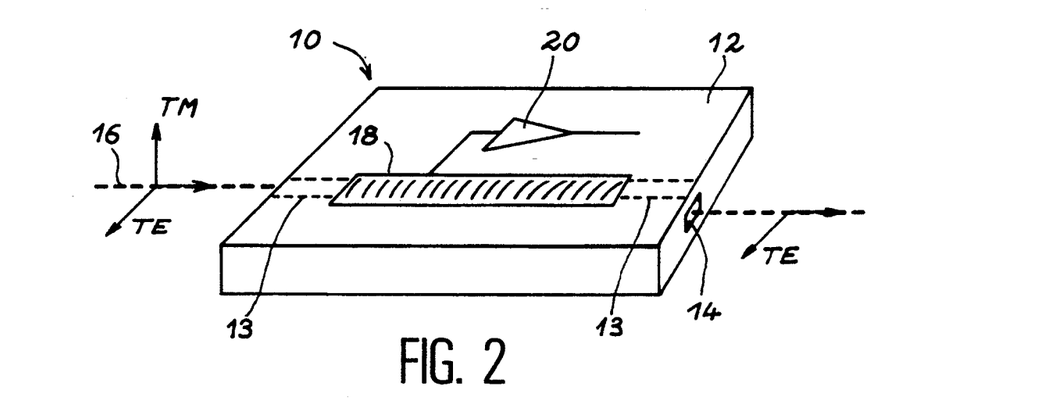
FIG. 2 is a schematic view of a guided-wave photodetector that is part of a photoreceptor according to the invention, potentially combined with a preamplifier which is integrated onto the same substrate as the photodetector.

FIG. 2 shows very schematically a basic guided-wave photodetector which can be used in a photoreceptor conforming to the invention.

This photodetector 10 is formed on a semiconductor substrate 12 and has a multilayer ribbon 13 with its optical confinement layers and the multiple quantum well active zone 14 which makes it possible to guide an incident light 16 and to absorb its component TM.

FIG. 2 also shows one 18 of the control electrodes of the photodetector 10 whose structure will be explained in greater detail below with reference to FIG. 6.

It can also be seen that a preamplifier 20 of the electrical signals sent by this photodetector 10 can also be integrated on the substrate 12.

The incident light 16 has two components, namely a magnetic transverse component TM whose electrical field has a perpendicular component in the plane of the multilayer ribbon 13 and a transverse electrical component TE which is parallel to the plane of the multilayer.

The photodetector 10 has a perfectly dichroic guidance structure (namely, the multilayer ribbon 13 with multiple quantum wells 14 that can simply be called a "multiple quantum well ribbon 14"), which preferably absorbs the component TM.

The component TE, which is virtually not absorbed, is available at the output end of the multiple quantum well ribbon 14.

Figure 3:
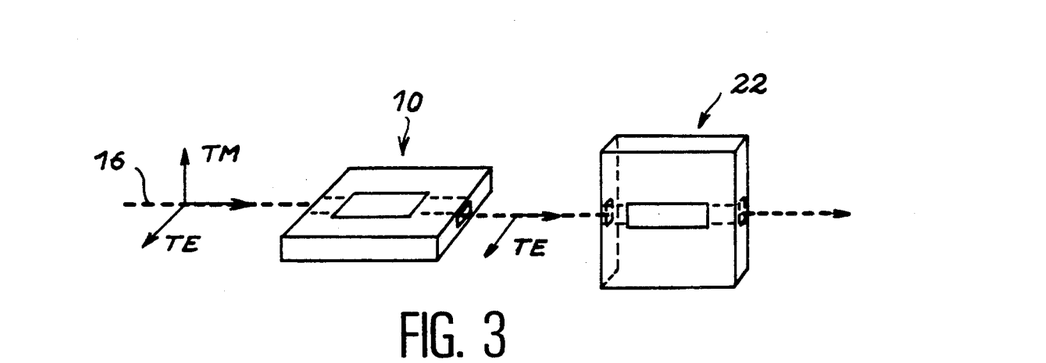
FIG. 3 shows schematically a photoreceptor according to the invention, which is a crossed mounting of two photodetectors like the one in FIG. 2.

FIG. 3 shows schematically a photoreceptor according to the invention, which has the photodetector 10 in FIG. 2, as well as another photodetector 22, which is identical to that photodetector 10 and is placed directly after the latter so as to ensure optical coupling of the multilayer ribbons.

The mounting of these two photodetectors 10 and 22 is hybrid and is also crossed, since the plane of the multilayer of the photodetector 22 is perpendicular to the plane of the multilayer of the photodetector 10.

Thus, the component TE which is perpendicular to TM and which comes from the photodetector 10 becomes perpendicular to the plane of the multilayer of the photodetector 22 and is absorbed preferentially by the latter.

Figure 4A:
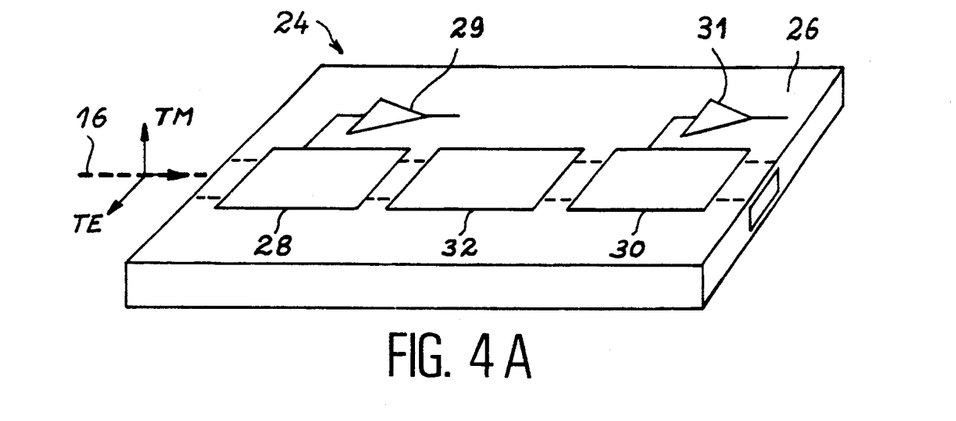
FIG. 4A is a schematic view of a monolithic photoreceptor with polarization diversity, in three sections, according to the invention.

FIG. 4A shows schematically another photoreceptor 24 conforming to the invention which, unlike the preceding one, is monolithic.

This photoreceptor 24 includes, on the same substrate 26, two identical photodetectors 28 and 30, as well as a polarization converter 32.

The photodetectors 28 and 30 are identical to the photodetector 10 in FIG. 2; these photodetectors 28 and 30 and the converter 32 are formed on the substrate 26 so that an incident light 16 passes through the photodetector 28, the converter 32 and the photodetector 30 in succession.

As before, the component TM of this light is preferentially absorbed in the photodetector 28; the component TE is virtually not absorbed and arrives at the input of the converter 32, which is a TE-to-TM polarization converter and thus converts the component TE into a component TM by applying an appropriate continuous voltage if it is an electrically controlled converter, or simply during propagation if it is a passive converter.

Thus, at the input of the photodetector 30, there is a light with a polarization TM for this photodetector 30, and the latter thus absorbs this light.

It can also be seen in FIG. 4A that preamplifiers 29 and 31 for amplifying the electrical signals supplied respectively by the photodetectors 28 and 30 may be put onto the substrate 26.

Figure 4B:
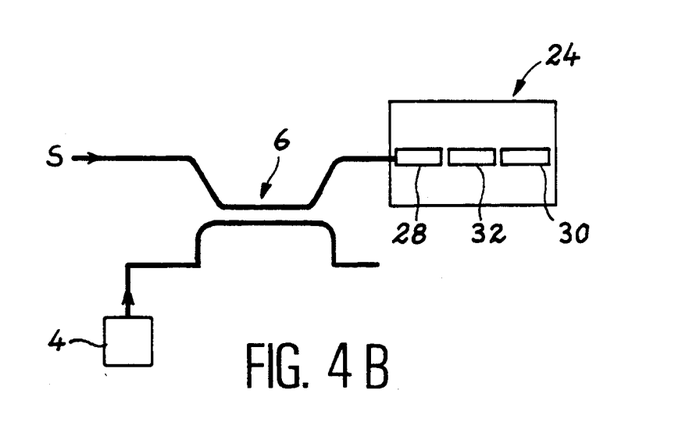
FIG. 4B shows schematically a non-equilibrated mounting of the photoreceptor in FIG. 4A.

FIG. 4B illustrates how a photoreceptor with polarization diversity 24 is used as a receptor for a coherent connection, in a non-equilibrated mounting.

It also shows the local oscillator 4 and the optical coupler 6, one of whose inputs receives the optical signal S and the other input of which receives the optical wave supplied by the local oscillator 4.

Figure 4C:
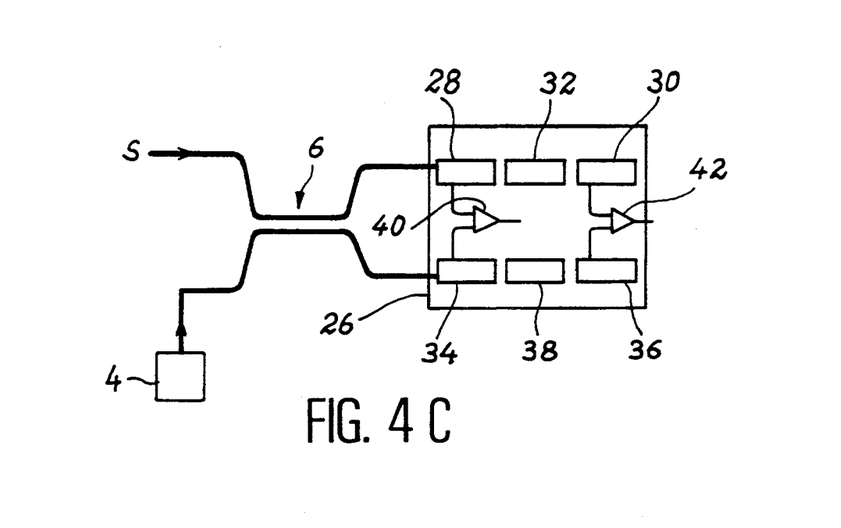
FIG. 4C shows schematically an equilibrated mounting using four photodetectors.

FIG. 4C illustrates schematically another photoreceptor with polarization diversity according to the invention, which includes the identical photodetectors 28 and 30 and the converter 32 which have already been described and are designed in the same way on the substrate 26, as well as two other identical photodetectors 34 and 36 and another TE-to-TM polarization converter 38, which are formed on the substrate 26, with the photodetector 34, the converter 38 and the photodetector 36 respectively identical to the photodetector 28, the converter 32 and the photodetector 30 and designed in the same way, as can be seen in FIG. 4C.

The photoreceptor shown in FIG. 4C is used as a balance-mounted receptor in a coherent connection.

In this case, the two outputs of the 3 dB optical coupler marked 6 are connected, respectively, to the inputs of the photodetectors 28 and 34.

FIG. 4C also shows a differential amplifier 40 whose inputs receive, respectively, the electrical output signals from the photodetectors 28 and 34 and another differential amplifier 42 whose inputs respectively receive the electrical output signals from the photodetectors 30 and 36.

The photodetectors and the polarization converters in question in the description of FIGS. 2, 3, 4A, 4B and 4C are produced in thin layers and multiple quantum wells of semiconductor materials, thin layers and multiple quantum wells which can be obtained by any method of fine epitaxial growth (CBE, MBE or MOCVD, for example).

The possibilities offered by the techniques for producing semiconductor-based quantum well structures for making optical-electronic devices are now well known.

In these structures, the carriers are confined in quantum levels located in the wells.

This invention uses the fact that the inter-sub-band transitions for the electrons in the quantum wells have very large oscillator forces and high absorption coefficients, with a transition energy which can be adjusted within a large range of wavelengths (between 20 micrometers and around 1 micrometer) playing on the thickness of the wells, or the composition of the wells, or the composition of the barriers, or all three at once.

It also uses the fact that these inter-sub-band transitions are highly selective in polarization and produce dichroic absorption of the light being propagated in the plane of the layers.

The component TM of the electromagnetic field is highly absorbed since its electrical field has a component perpendicular to the layers, while the other component TE is not.

It is also possible to fine tune the absorption wavelength in these structures by means of static electrical voltage applied perpendicular to the layers.

The preceding will now be illustrated taking a photoreceptor for receiving radiation whose wavelength is 1.55 micrometer which can be used for single-mode fiber-optic connections; this photoreceptor is produced on a GaAs substrate; each multilayer with multiple quantum wells is a GaAs/AlAs type and is there to absorb radiation with a wavelength equal to 1.55 micrometers because of the inter-sub-band transition 1 to 4.

It would not go beyond the framework of the invention to conceive of receiving wavelengths in other ranges by means of the same material or any other combination of semiconductor materials.

In the known fiber-optic communications networks, at 1.55 micrometers, the photoreceptors combine a photodetector (GaInAs/InP avalanche photodiode or GAInAs-type p-i-n photodiode) with a preamplifier (MESFET or TEGFET GaAs) in a hybrid mounting, since some components can then be assembled which are optimized independently of one another, with each component having the best performance for its function.

However, the integration of the photodetector and the preamplifier, which is desirable for reasons of cost, does not give as good results because the 1.55 micrometer photodetectors must be made of GaInAs on a substrate made, of InP, materials which do not make it possible to produce excellent built-in preamplifiers.

In addition, while the production of microelectronic components on the material InP has great potential, the production of microelectronic components on the GaAs compound has very general advantages (large forbidden band, good mechanical behavior, low vapor tension, . . . ) which yield more reliable, less expensive components.

In this invention, 1.55 micrometer photodetectors are produced on a GaAs substrate, which makes it possible to produce an integrated photoreceptor that uses all the advantages of the microelectronic components formed on such a substrate made of GaAs for amplification.

This, then, is a solution that performs as well but costs less than the hybrid solution mentioned above.

The forbidden band for GaAs at ambient temperature (0.87 micrometer) does not permit the use of 1.55 micrometer band-band transitions.

In this invention, inter-sub-band transitions are used in a GaAs/AlAs multiple quantum well structure.

Figure 5A:
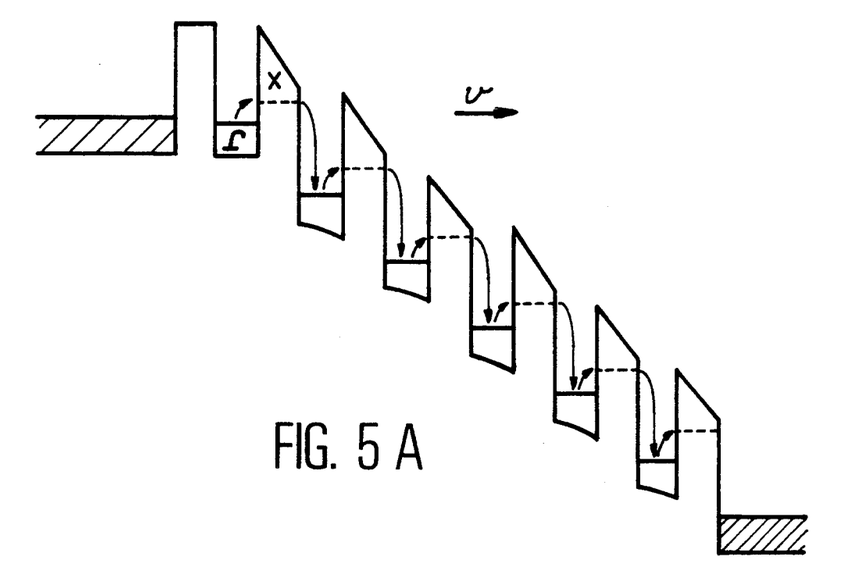
FIG. 5A illustrates schematically a dark current in a GaAs/AlAs multiple quantum well structure.
Figure 5B:
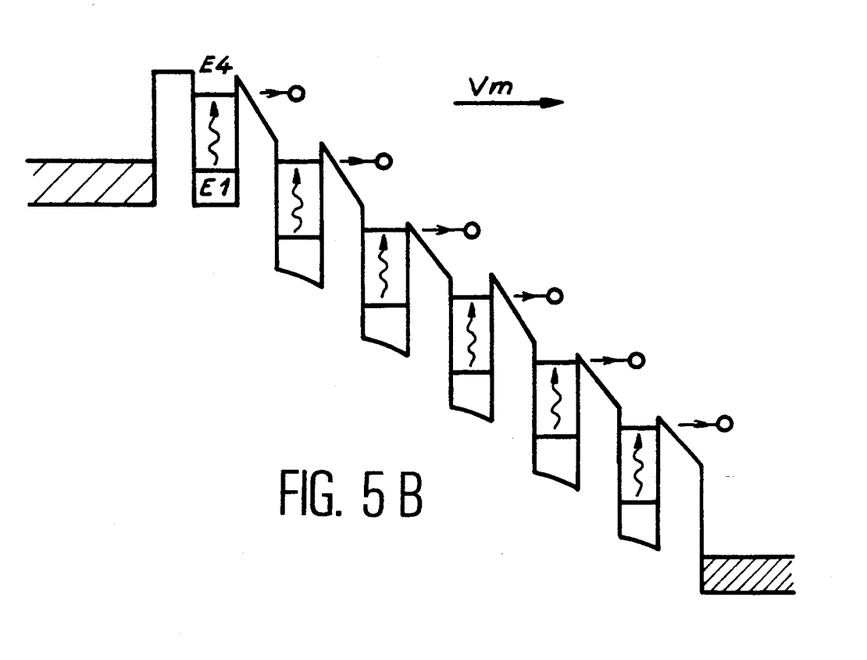
FIG. 5B illustrates schematically a photocurrent in such a structure.

Remember that the radiation brings electrons which are present due to doping in the GaAs wells, in the high-energy levels near the "continuum" of states above the AlAs barriers (see FIG. 5B).

These electrons cross into the continuum by the tunnel effect through the barrier (which has a triangular shape in an electrical field).

There, they produce a photocurrent, provided that their average speed Vm in the continuum is clearly faster than the speed v of the electrons in the dark current (FIG. 5A).

The conduction band "offset" between GaAs and AlAs near the gamma minimum (marked with the usual Greek letter in FIG. 5A) is on the order of 1 eV.

In a GaAs/AlAs multiple quantum well structure, the energy separating levels 1 and 2 varies with the width of the well (GaAs) between 0, when this width tends toward infinity, and 0.665 eV, when its width $\underline{a}$ is equal to 2 nm.

This is insufficient to reach 1.55 micrometer (0.8 eV) and only transitions between level 1 and a level greater than 2 permit it.

Transitions from level 1 to level 3, which are forbidden in a zero field in the insulated quantum well, are eliminated.

For holes whose thickness is on the order of 6.7 nm, the separation between the levels 1 and 4 attains a suitable value (in FIG. 5B, E1 and E4 represent, respectively, the energies of these levels 1 and 4).

Moreover, level 4 is near the continuum of the states located above the AlAs barriers, which is favorable for passage to those states.

To offset the weakness of the coefficient of absorption for transition 1 to 4, compared to the one that corresponds to transition 1 to 2, guided propagation is used, with a great material thickness thus being traversed.

Figure 6:
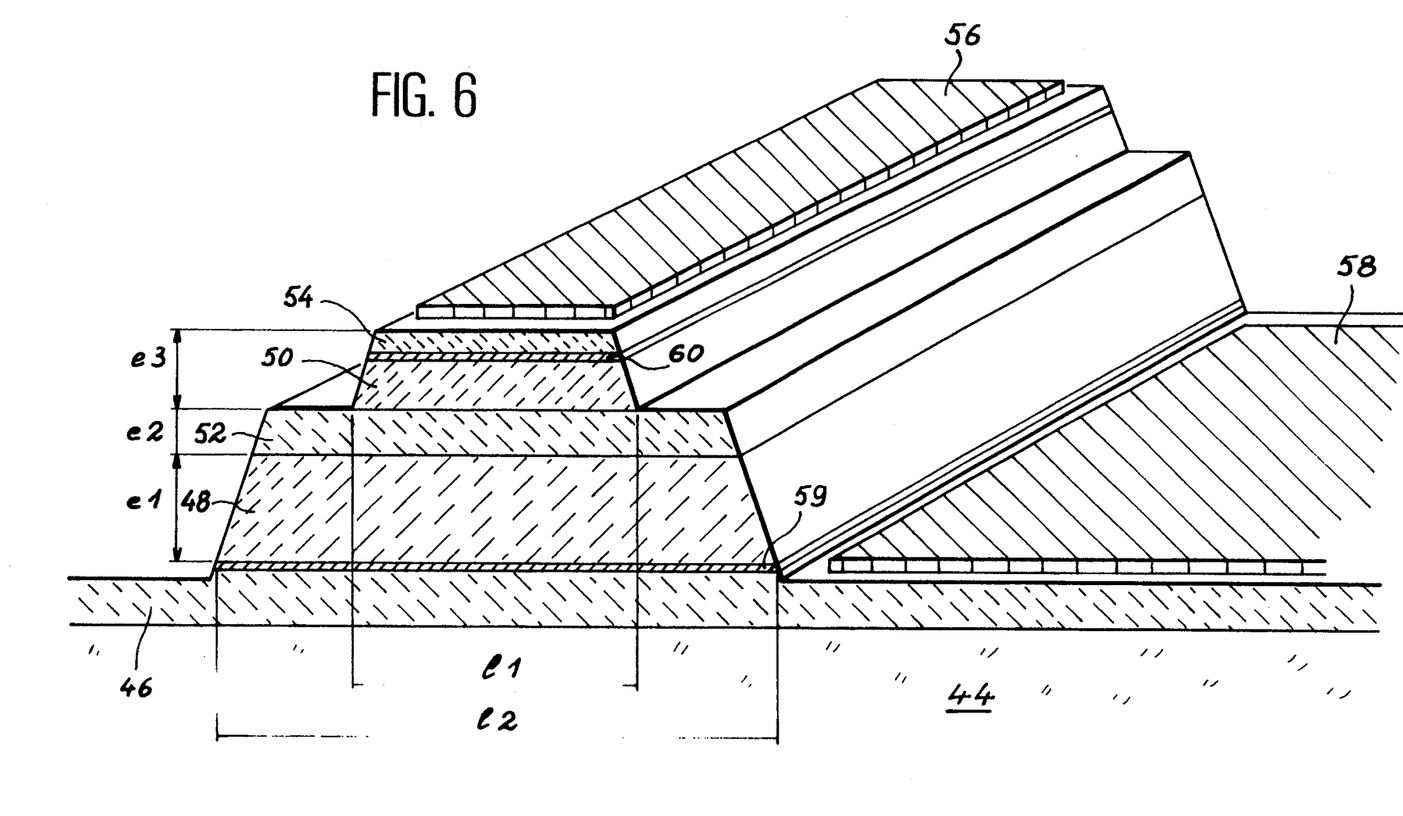
FIG. 6 is a schematic view of the structure of a basic photodetector that can be used in this invention.

The structure of a photodetector that can be used in this invention is shown schematically in FIG. 6.

Purely for indicative purposes, but not in any way limiting, the optical guide (multiple quantum well multilayer ribbon that this structure includes) is around 200 micrometers in length, which results in good absorption of the incident light.

In the example in FIG. 6, the photodetector that can be used in the invention includes, on a semi-insulating substrate 44 made of GaAs, a contact layer 46 made of GaAs doped n+ on which are two confinement layers 48 and 50 made of AlAs doped n+ and between them, a multiple quantum well layer 52 which has alternating layers of doped n GaAs and doped n $Ga_{1-x}Al_xAs$ layers (for example, AlAs).

A contact layer 54 of doped n+ GaAs is over the layer 50 and an electrode formed by a layer 56 of AuGeNi is over the layer 54.

As can be seen in FIG. 6, the stacked layers 48 to 56 form a mesa on the contact layer 46 and, beside this mesa, another electrode 58 of AuGeNi is formed on the contact layer 46.

The electrodes 56 and 58 form the contacts.

Purely by way of indication and in no way limiting, n is around $10^{18}$ cm$^{-3}$, n+ is around $2 \times 10^{18}$ cm$^{-3}$, the width L1 of the layer 50 is, at its base, equal to 2 micrometers; the width L2 of the layer 48 is, at its base, equal to 5 micrometers; and the respective heights e1, e2 and e3 of the layers 48, 52 and 50 are equal to 2 micrometers, 0.8 and 1 micrometer, respectively.

The incident light is guided by the layer 52 which absorbs the component M from that light.

In order to avoid abrupt heterojunctions, a transition layer 59 can be provided between the contact layer 46 and the confinement layer 48, and another transition layer 60 can be provided between the confinement layer 50 and the contact layer 54.

Each of these transition layers can be a layer made of $Ga_{1-x}Al_xAs$ whose aluminum content x varies gradually from 0 on the GaAs side to 1 on the AlAs side.

As a variation, each transition layer is an alternation of GaAs and AlAs layers; the thickness of these GaAs layers increases from the corresponding confinement layer to the corresponding contact layer, while the thickness of the AlAs layers decreases going from the confinement layer to the contact layer.

The difference of optical indices between the multiple quantum well layer 52 and the confinement layers (difference around 0.2) is sufficient to obtain a good cover between the optical mode and the absorbent zone.

The lateral confinement is obtained by a ribbon structure produced in mesa technology, but other solutions, such as the epitaxy process, induced alloy disorder or implantation, for example, could be used to do so; these modes of embodiment are given purely by way of indication and are in no way limiting.

To produce good epitaxy of the multiple quantum well layers and effective doping of the confinement layers, it can be advantageous to improve the quality of the AlAs confinement layers by periodically inserting in them some GaAs "wells" (for example, a layer of GaAs 5 nm thick every 50 nm), all the more so since the lower confinement layer must be thick to insulate the guidance layer of the substrate whose optical index is greater.

Note that the guided-wave structure of the photodetector has the advantage of integrating two functions that are generally assigned to different devices, namely the optical interconnection and detection functions; this is illustrated well in the case of the equilibrated photoreceptor (FIG. 4C): In the case in the invention, only two input gates are needed, while normally four input gates are needed.

The dark current comes from the derivative of the electrons populating the wells under the field applied by successive transfers between the gamma states and the X states.

With some barriers $\underline{b}$ rather wide (b>10 nm), the contributions of the conduction currents by sequential tunnel effect and by hopping can be considerably reduced.

At ambient temperature and low voltage, the thermo-ionic emission current dominates.

Figure 7:
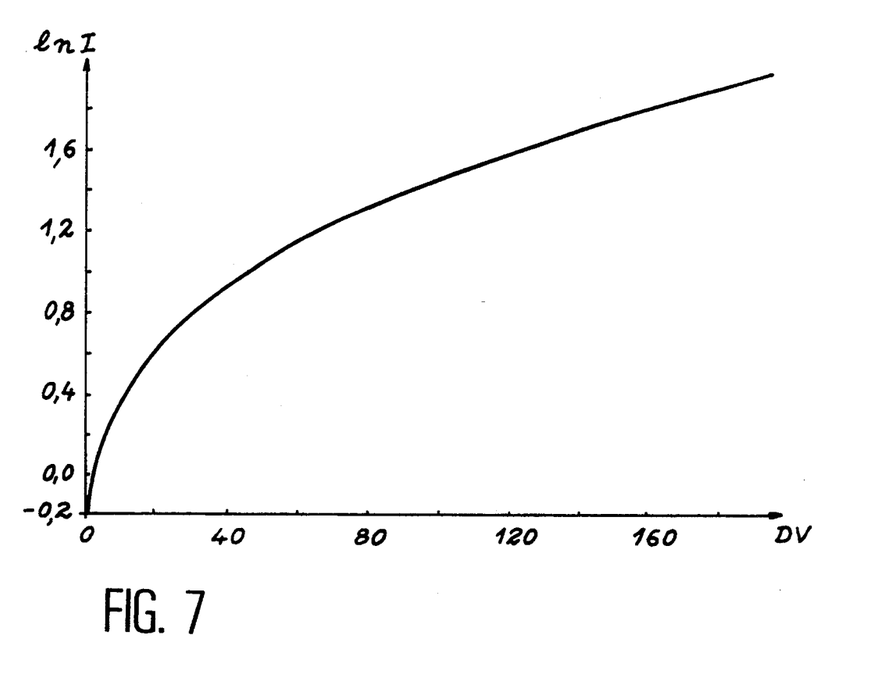
FIG. 7 is the current-voltage characteristic curve of the photodetector in FIG. 6, assuming the original current is purely thermoionic.

FIG. 7 gives the current-voltage characteristic curve obtained (LnI, where I is the intensity of the current expressed in A/cm$^2$, as a function of the voltage drop DV expressed in mV), with the current assumed to be purely thermo-ionic in origin.

For a 40 mV polarization voltage per period (around 2V for a micrometer) and a surface of around $10^{-5}$ cm$^2$, a dark current of 100 microamperes can be obtained.

It is possible to consider reducing this dark current by multiplying the number of interfaces where the gamma-X coupling is produced, for example by inserting thin wells made of GaAs in the AlAs barriers.

Figure 8:
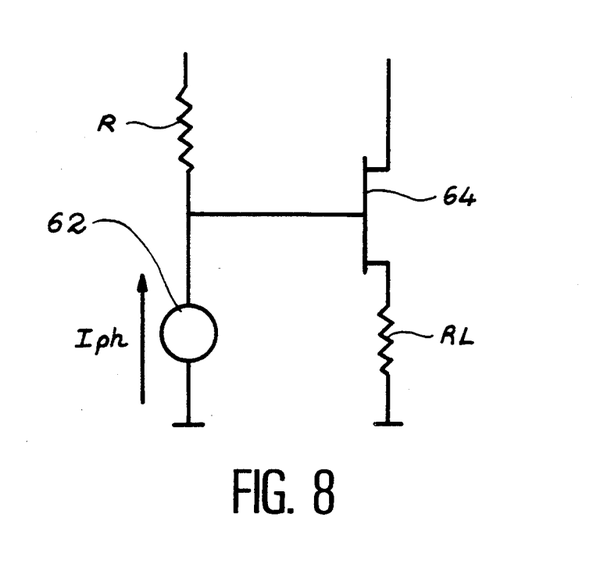
FIG. 8 is an electrical schematic of the mounting of this photodetector and a preamplifier.

FIG. 8 gives, by way of indication, an electrical schematic drawing of the photodetector in FIG. 6, marked 62 in FIG. 8, combined with a field-effect preamplifier transistor marked 64.

This schematic shows the load resistance R of the photodetector which is also the polarization resistance of the grid of the transistor 64, as well as the load resistance RL of the transistor, in a common drain mount; Iph represents the photocurrent.

The values of RL should be adjusted on the basis of the characteristics of the photodetector and the transistor so as to set the grid voltage and the drain-source voltage.

A dark current of 100 microamperes limits the value of R to several dozen kiloohms.

The minimum power detectable with this photodetector 62 is considerably higher than in regular low dark-current detectors; this is not a big problem in coherent detection since the local oscillator delivers a lot of optical power.

Special modes of embodiment of the photoreceptor that is the object of the invention are described below; they include, successively, a photodetector in mode TM, an electrically controlled polarization converter TE-TM and a second photodetector in mode TM.

Such a configuration has the advantage of simplifying the design of the coherent-detection photoreceptor, since the signal can have any polarization.

The polarization of the local oscillator is set at 45°, and the component TM is measured in the first photodetector; the components TE of the signal and the local oscillator are sent to the polarization converter; and they are detected in mode TM in the second photodetector (see FIG. 4B).

The TE-TM converter is not described in detail.

Remember that the electrically controlled converter is a guidance structure (made of GaAs or other materials) with confinement layers ensuring guidance in the plane and with a ribbon configuration ensuring lateral guidance; this structure is oriented on the <110> axis (on a semi-insulating <001> GaAs substrate).

An electrical field in the plane of this structure (along <110>) induces a double refraction by an electrical-optical effect.

The modal double refraction must be offset by an electrical-field configuration alternately in one direction, then in the other, with a precise periodicity (alternating delta-beta converter).

This electrical field is obtained by an alternation of contacts p and n (diffused or implanted) around the waveguide and is distributed in the zones i of the planar structures p-i-n thus formed.

It is also possible to make polarization converters on a <110> oriented substrate.

Since the creation of the multiple quantum well photodetectors is independent of the orientation of the substrate, provided that the epitaxial growth is controlled according to the orientation chosen, the converter and photodetector unit can be made on the same substrate no matter what the orientation.

A problem arises due to the difference in nature between the layers of the photodetector which should be doped, and the layers of the polarization converter in which the densities of free carriers should remain negligible to avoid losses.

Figure 9A:
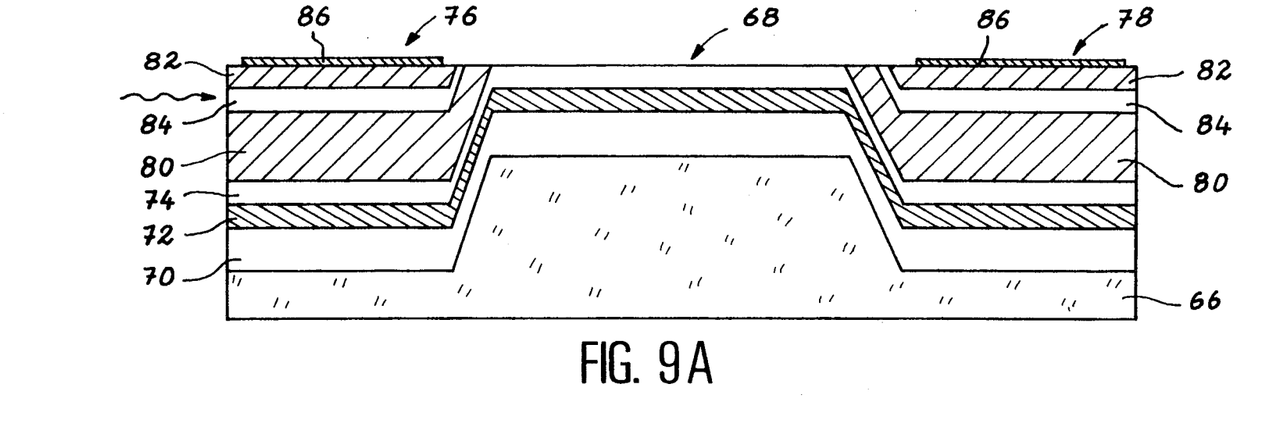
FIGS. 9A, 9B and 10A, 10B are schematic views of photoreceptors according to the invention, including, on the same substrate, two photodetectors and one electrically-controlled polarization converter between those two photodetectors.
Figure 9B:
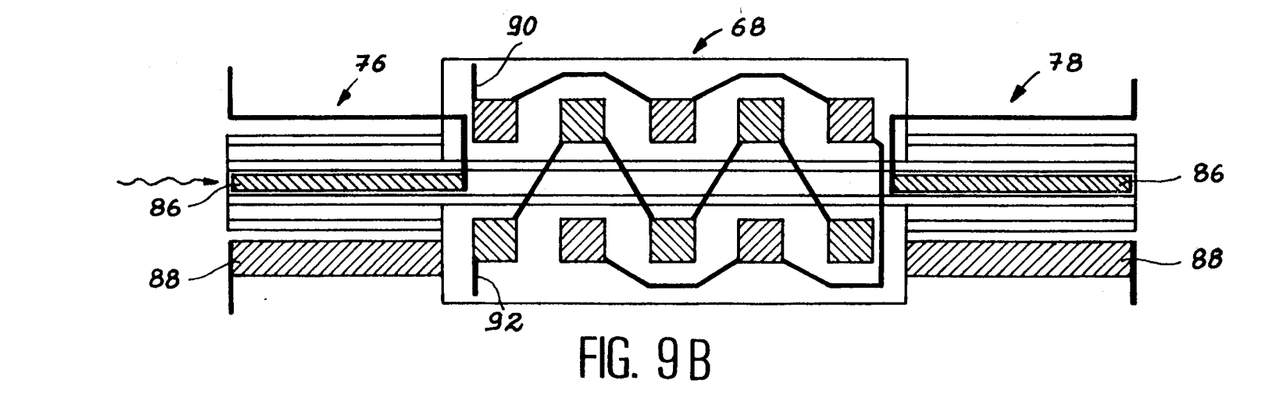
Figure 10A:
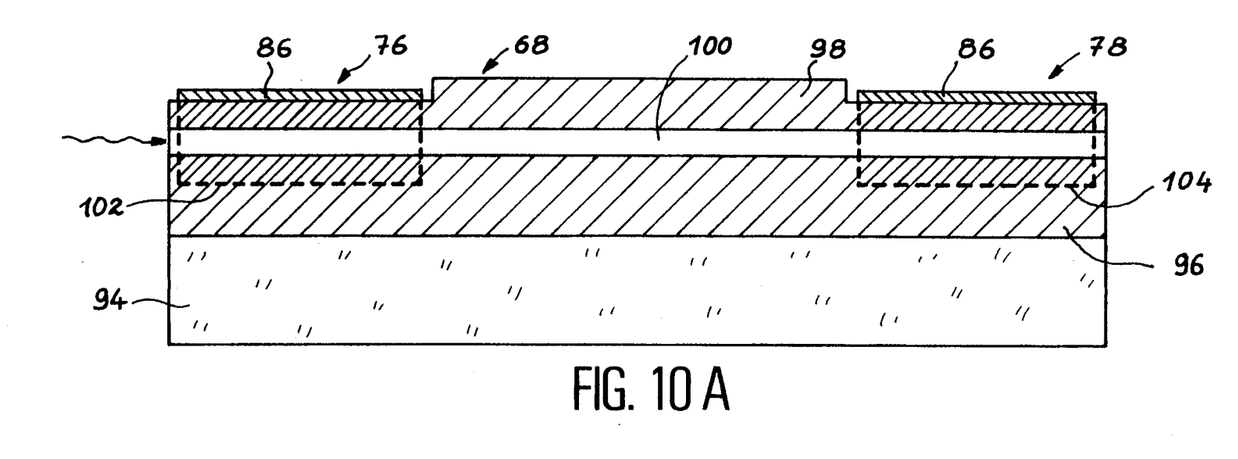
Figure 10B:
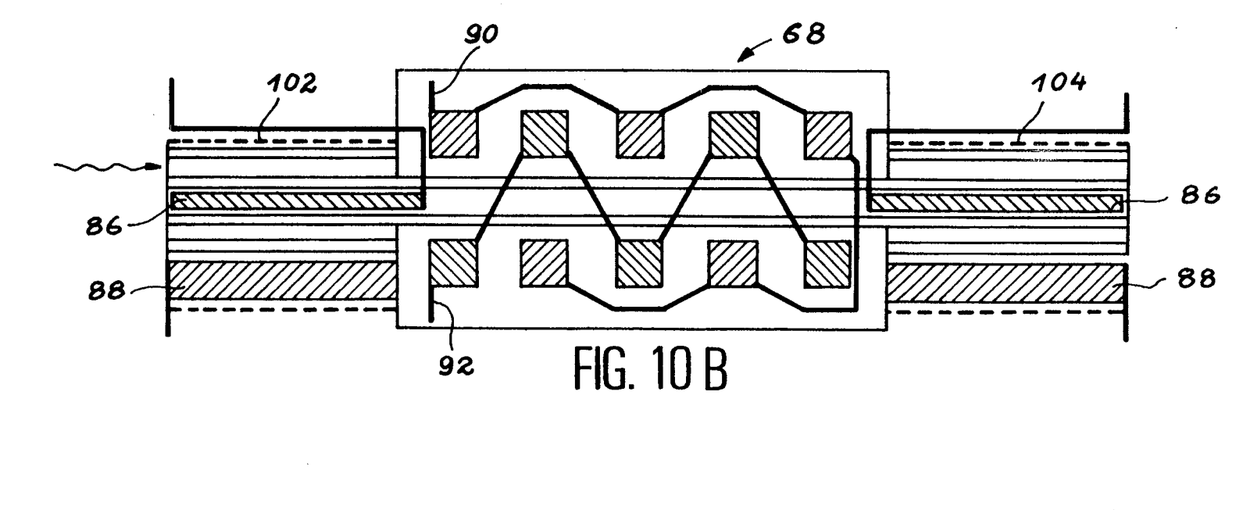

This problem can be approached in two different ways:

the first way is to use epitaxy to create two different sets of layers, one for the photodetection sections and the other for the TE-TM conversion section (FIGS. 9A and 9B);

the second way is to use the same non-doped layers in the three sections and to change the doping of the photodetection sections afterward (FIGS. 10A and 10B).

The second way has the advantage of simplifying the optical coupling between the elements.

A more detailed explanation follows of the first way of proceeding (integration of photodetectors and a converter which are independent).

Several configurations are possible here, depending on the type of optical coupling used between the different components.

With some photodetectors like the one in FIG. 6, a GaAs converter is used with confinement layers made of GaAs or made of GaAs/AlAs multiple quantum wells.

An initial configuration uses an epitaxy procedure:

first of all, a first set of layers, for example those of the photodetectors, are epitaxied, then, they are removed by any process of attack at the site where the converter is to be inserted, then, the layers of the converter are epitaxied.

There are subsequent steps in the technology for removing the layers that then cover the photodetectors, so as to allow contacts to be made and to form the ribbon.

A second configuration uses end coupling.

This second configuration is the one which is illustrated in FIG. 9A, which is a longitudinal section of the photoreceptor in three sections, and in FIG. 9B, which is a view of this photoreceptor from above.

This end-coupling method resembles the preceding epitaxy process method, but it starts with a substrate already engraved so as to avoid the epitaxy procedure.

All the layers are then epitaxied at once, starting with those of the converter, which best retain their crystalline quality.

The guidance layers of the different sections face each other ("butt coupling") as can be seen in FIG. 9A and 9B.

The layers covering the converter are then removed so the contacts can be made.

Going back to FIGS. 9A and 9B, FIG. 9A shows the substrate 66 made of semi-insulating GaAs which is prepared beforehand so as to have a superelevation where the converter 68 goes.

This substrate has piled on it in succession a confinement layer 70 with GaAs/AlAs multiple quantum wells, a GaAs guidance layer 72 and another confinement layer 74 with GaAs/AlAs multiple quantum wells.

Each of the photodetectors 76 and 78 which are located on both sides of the converter, has, on the confinement layer 74, two confinement layers 80 and 82 made of AlAs doped n+ and, between them, a multiple quantum well layer 84 (homologue of the layer 52 in FIG. 6).

The contact layers made of doped GaAs, designed to facilitate the ohmic contacts on AlAs are not shown.

FIG. 9B shows the electrodes 86 and 88 of each photodetector and the contacts n, marked 90, as well as the contacts p, marked 92, of the converter.

A third configuration uses inter-connections:

Here again, all the layers are epitaxied at once.

Then the layers that cover the converter are removed and each of the components is delimited.

In the next step, a low-index material (for example, silica) is deposited and then engraved to obtain waveguides making optic interconnections between the converter and the photodetectors according to the techniques developed in integrated optics ("tapered coupling" for example).

Now, let's go back to the second way of proceeding (complete integration of the photodetectors and the polarization converter).

Starting with a stack of layers corresponding to the structure of the photodetector, but not doped, a TE-TM converter can be made whose active layer is the multiple quantum well layer.

The light beam can thus be propagated in the three sections of the component without encountering any discontinuity (FIG. 10A and 10B).

The problem is to dope the photodetection after epitaxy.

The best solution is to implant a dopant (Si) by ion implantation in the area where the mode TM is propagated.

Attention must be paid that the doping falls short of around $10^{18}$ cm$^{-3}$, since an implantation dose that is too high causes interdiffusion of the gallium and the aluminum in the multiple quantum well layer and takes it back to the alloy state (this latter property can also be taken advantage of to make the lateral confinement of the waveguide, by replacing the guide by mesa, but with some clearly lower differences in index; the advantage is to arrive at a fully implanted planar technology).

To obtain uniform doping of the multiple quantum well layer through the AlAs, it is preferable to reduce the thickness of the upper confinement layer.

This disadvantage should be able to be tolerated, considering the short length of the photodetector (around 200 micrometers, for example) and the confining effect of the metal deposit of the upper contact.

The implantation should also be carried out deeply enough and on a wide enough surface so that the lower contact can be made.

Returning to FIGS. 10A and 10B, one can see in FIG. 10A the substrate 94 made of semi-insulating GaAs, which is surmounted by the confinement layers 96 and 98 made of AlAs between which is the multiple quantum well layer 100 made of GaAs/AlAs.

The contact layers are not shown, either.

The layers 96, 98 and 100 are not doped on the polarization converter 68 but are doped by silica implantation on the photodetectors 76 and 78.

The areas doped by implantation are delimited by dotted lines in FIGS. 10A and 10B and are marked 102 and 104.

We claim:

1. A photoreceptor comprising a first photodetector (10, 28, 34, 76) and a second photodetector (22, 30, 36, 78), said second photodetector being placed after said first photodetector, wherein the first photodetector is formed on a semiconductor substrate (12, 26, 44, 66, 94) and has a multilayer ribbon with multiple quantum wells made of semiconductor materials (14, 52, 84, 100), said multilayer ribbon is provided to guide an incident light (16) and said first photodetector is capable of preferentially absorbing the transverse magnetic component (TM) of that light, whose electrical field has a component perpendicular to the plane of the multilayer, a transverse electrical component (TE) of said incident light is not absorbed in the first photodetector, said second photodetector being provided to absorb said transverse electrical component.

2. A photoreceptor according to claim 1, wherein the second photoreceptor (22, 30, 36, 78) is also formed on a semiconductor substrate (26, 66, 94) and has a multilayer ribbon with multiple quantum wells made of semiconductor materials (84, 100), said second photoreceptor multilayer ribbon being provided to guide said incident light.

3. A photoreceptor according to claim 2, wherein the mounting of first and second photodetectors is hybrid and the second photodetector (22) is placed directly after the first photodetector (10) and oriented so that its multilayer ribbon is in the extension of the first photodetector multilayer ribbon and the respective planes of the constituent multilayers are perpendicular.

4. A photoreceptor according to claim 2, wherein the first photodetector (28, 34, 76) and the second photodetector (30, 36, 78) are integrated on the same semiconductor substrate (26, 66, 94) so that continuity in the optical guidance is ensured between the multilayer ribbon of the first photodetector and that of the second photodetector, and the respective planes of these multilayers are parallel, and by the fact that the photoreceptor also has a polarization converter (32, 38, 68) which is formed on this same substrate in a ribbon structure as well, ensuring continuity in the optical guidance and is between the first photodetector and the second photodetector, which is provided to transform the transverse electrical polarization of the light coming from the first photodetector into a transverse magnetic polarization having a component of the electrical field perpendicular to the plane of the multilayer of the second photodetector, said polarization-transformed light is injected into the second photodetector where it is absorbed.

5. A photoreceptor according to claim 1, wherein each photodetector is formed on a substrate (66, 94) made of GaAs.

6. A photoreceptor according to claim 5, wherein each multilayer with multiple quantum wells (84, 100) is the GaAs/AlAs type and is provided to absorb radiation with a wavelength equal to 1.55 micrometers through the inter-sub-band transition 1 to 4.

7. A photoreceptor according to claim 4, wherein the converter (68) is electrically controlled, with the first photodetector (76), the converter (68) and the second photodetector (78) formed on the substrate (66) in three distinct zones, respectively, from epitaxied layers which, for the zones of the photodetectors, are different from those of the converter zone.

8. A photoreceptor according to claim 4, wherein the converter is passive, and the first photodetector (28, 34), the converter (32, 38) and the second photodetector (30, 36) are formed on the substrate (26), respectively in three distinct zones, from identical epitaxied layers for the zones of the photodetectors, from dielectric layers deposited for the converter.

9. A photoreceptor according to claim 4, wherein the converter (68) is electrically controlled, and the first photodetector (76), the converter (68) and the second photodetector (66) are formed on the substrate (94), respectively in three distinct zones, from epitaxied layers which are identical for the three zones, with the zones of the photodetectors suitably doped, while the zone of the converter is not doped.

10. A photoreceptor according to claim 1, wherein each photodetector which is integrated on a substrate is combined with a preamplifier (20, 29, 31, 64) which processes the signal supplied by this photodetector and which is integrated on the same substrate as the photodetector.

11. A photoreceptor according to claim 1, further comprising two pairs of photodetectors, each pair of photodetectors having said first photodetector and said second photodetector and functioning in a two-way equilibrated mounting.

12. A photoreceptor according to claim 11, wherein the photodetectors are integrated on the same substrate, the first photodetectors are combined with a differential input preamplifier (40) which processes the signals supplied by the first photodetectors, the second photodetectors are combined with a differential input preamplifier (42) which processes the signals supplied by said second photodetectors, the preamplifiers are integrated on the same substrate as the photodetectors.

13. A photoreceptor comprising a first photodetector (10, 28, 34, 76) and a second photodetector (22, 30, 36, 78), said second photodetector being placed after said first photodetector, wherein the first photodetector is formed on a semiconductor substrate (12, 26, 44, 66, 94) and has a multilayer ribbon with multiple quantum wells made of semiconductor materials (14, 52, 84, 100), said multilayer ribbon being provided to guide an incident light (16) and to absorb said incident light by means of an intra-band transition between two subbands, said first photodetector being capable of preferentially absorbing the transverse magnetic component (TM) of said incident light, whose electrical field has a component perpendicular to the plane of the multilayer, the transverse electrical component (TE) of said light is not absorbed in the first photodetector, said second photodetector being provided to absorb said transverse electrical component.

* * * * *